United States Patent [19]
Shipman

[11] Patent Number: 5,881,282
[45] Date of Patent: Mar. 9, 1999

[54] CONTROLLING ILL-BEHAVED COMPUTER ADD-ON DEVICE THROUGH A VIRTUAL EXECUTION MODE

[75] Inventor: Mark S. Shipman, Hillsboro, Oreg.

[73] Assignee: Intel Corporation, Santa Clara, Calif.

[21] Appl. No.: 762,585

[22] Filed: Dec. 10, 1996

[51] Int. Cl.$^6$ ..................................................... G06F 11/00
[52] U.S. Cl. .................... 395/652; 395/591; 395/184.01; 395/284
[58] Field of Search ............................ 395/183.12, 183.2, 395/184.01, 284, 651, 652, 830, 591

[56] References Cited

U.S. PATENT DOCUMENTS

| | | | |
|---|---|---|---|
| 5,675,748 | 10/1997 | Ross | 395/284 |
| 5,689,726 | 11/1997 | Lin | 395/830 |
| 5,692,189 | 11/1997 | Lipe | 395/651 |

Primary Examiner—Glenn A. Auve
Attorney, Agent, or Firm—Blakely, Sokoloff, Taylor & Zafman LLP

[57] ABSTRACT

A computer system is programmed with basic input/output services (BIOS), including an initialization service, and an associated virtual mode execution monitor. The initialization service scans for option ROMs of add-on devices at power on/reset. For each detected option ROM, the initialization service creates the runtime definition of its initialization task, setting up the initialization task to be executed in a virtual mode, redirecting all interrupts and exceptions arisen during execution of the initialization task to the virtual mode execution monitor. For each redirected interrupt/exception, the virtual mode execution monitor either allows the triggering attempted operation to be performed, or substitutes an impermissible triggering attempted operation with one or more fail safe recovery operations, or simply terminates the "ill-behaving" initialization task.

19 Claims, 3 Drawing Sheets

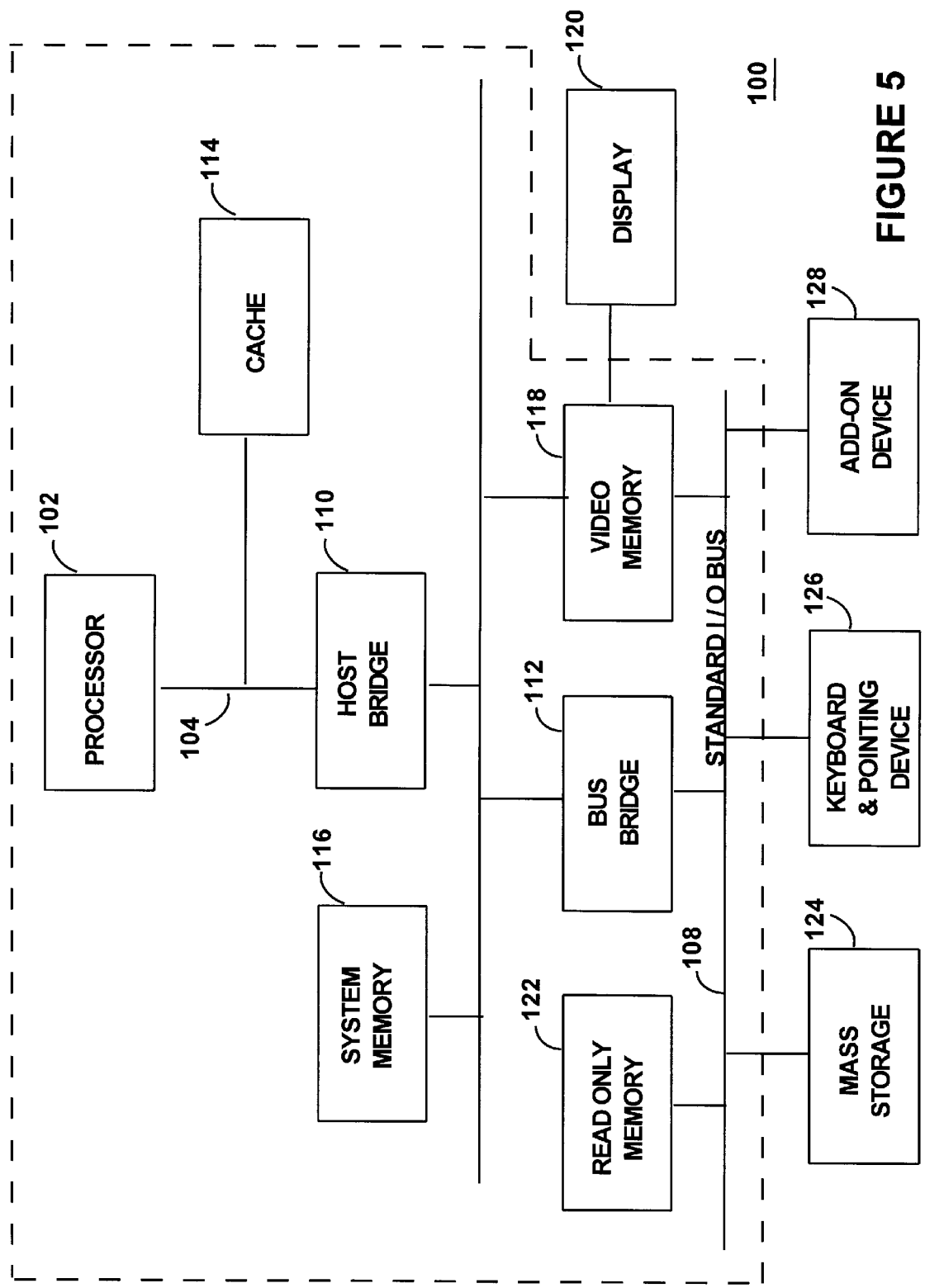

CONTROLLING ILL-BEHAVED COMPUTER ADD-ON DEVICE THROUGH A VIRTUAL EXECUTION MODE

BACKGROUND OF THE INVENTION

1. Field of the Invention

The present invention relates to the field of computer systems. More specifically, the present invention relates to the controlling of ill-behaved add-on devices.

2. Background Information

It is axiomatic that "one size does not fit all". The axiom certainly applies to the art of computer systems, as they come in the form of entry level desktop computers for home computing, to large mainframes for numeric intensive computations. Even within a segment of the market, it is not unusual to find various functional features being offered as "add-on" devices, such as video capture devices in the case of personal computers.

Many add-on devices come with optional read only memories (ROMs) having embedded control software stored therein. Typically, the control software of an add-on device would include an initialization task for configuring said add-on device. As a result, the base systems are vulnerable to ill-behaved initialization tasks of add-on devices.

While the add-on device manufacturers have an interest in ensuring that their add-on devices will work properly with the targeted based systems, it is the base system manufacturers who have the most vested interest in ensuring that their systems will work reliably, with or without any number of add-on devices. However, as well appreciated by those skilled in the art, there are literally hundreds of "optional" devices, manufactured by many different vendors, available for add-on to personal computers. Therefore, it is virtually impossible for a system manufacturer to ensure that its systems will work properly with each and every one of these potential add-on devices. Even if we were to assume that it is possible to test and validate a base system with all the existing potential add-on devices, there will always be new add-on devices becoming available after the pre-release validation, in the life span of a system.

Thus, it is desirable to have an approach such that a system manufacturer can be in the driver's chair in preventing any mis-behavior by an add-on device, and thereby in a better position to ensure the overall reliability of the system.

SUMMARY OF THE INVENTION

In view of the limitations of the prior art, and the above described desire, a computer system programmed with basic input/output services (BIOS), including an improved initialization service, and an associated virtual mode execution monitor is invented. The initialization service scans for option ROMs of add-on devices at power on/reset. For each detected option ROM, the initialization service creates the task state for the option ROM's initialization task, in particular, setting the initialization task to be executed in a virtual mode, under which system protection features are employed, but appear to be unemployed to the initialization task, and redirecting all interrupts and exceptions arisen during the execution of the initialization task to the virtual mode execution monitor.

The virtual mode execution monitor includes logic for handling the redirected interrupts and exceptions. For each redirected interrupt/exception, the virtual mode execution monitor either allows the triggering attempted operation to be performed, or substitutes an impermissible triggering attempted operation with one or more fail safe recovery operations, including retargeting or virtualizing the performance of the triggering attempted operation, or simply terminates the "ill-behaving" initialization task.

BRIEF DESCRIPTION OF DRAWINGS

The present invention will be described by way of exemplary embodiments, but not limitations, illustrated in the accompanying drawings in which like references denote similar elements, and in which:

FIG. 5 illustrates one embodiment of a computer system suitable for programming with the embodiment of the present invention illustrated in FIGS. 1–2.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, in the order of presentation.

Figure 1:
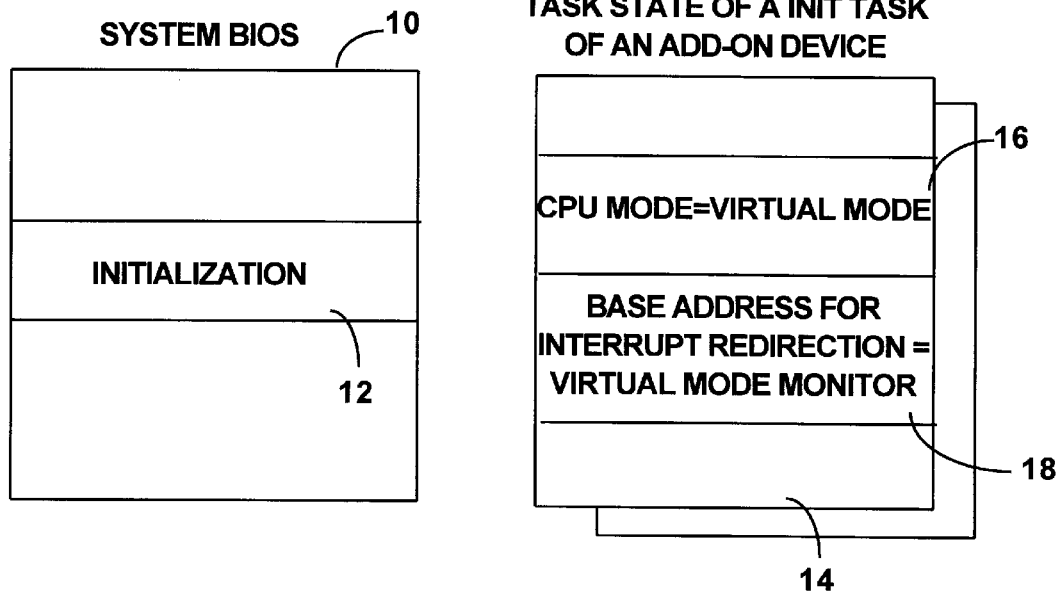
FIGS. 1–2 illustrate one embodiment of the present invention.
Figure 2:
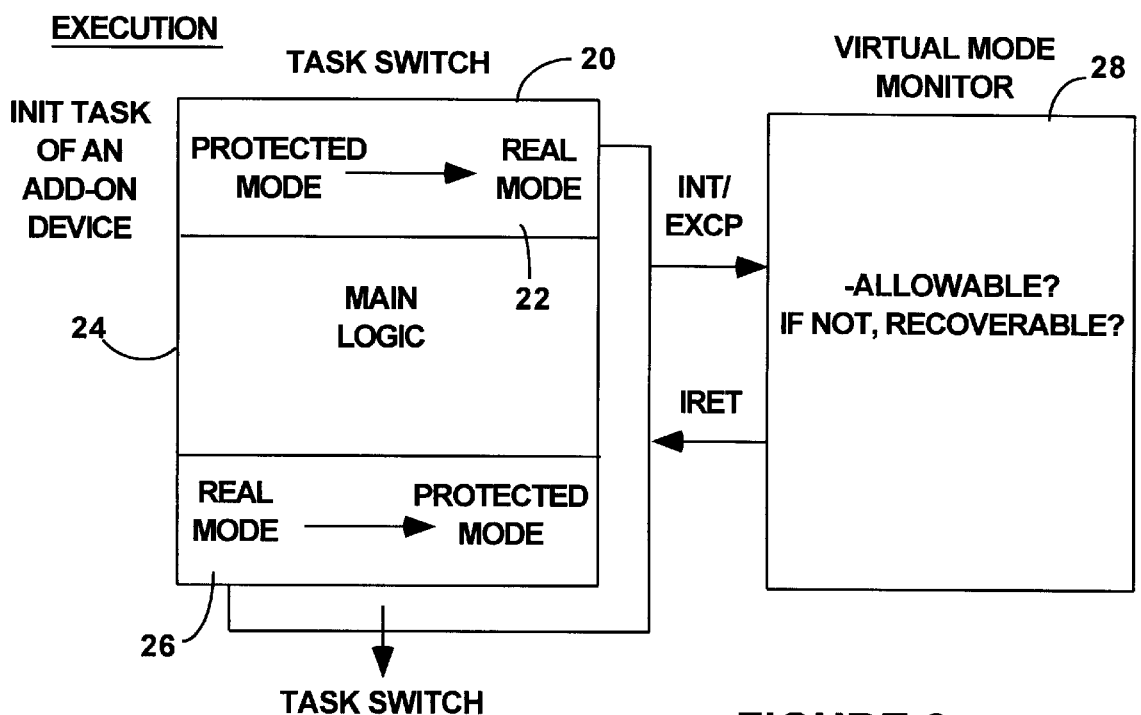

Referring now to FIGS. 1–2, wherein one embodiment of the present invention is shown. As illustrated, the present invention comprises initialization service 12 of system BIOS 10 and virtual mode execution monitor 28. Initialization service 12 comprises logic for creating the execution context of all initialization tasks 20 found in option ROMs of add-on devices. More specifically, initialization tasks 20 are set up to execute in a virtual mode, under which initialization tasks 20 are executed with the base system's protection features employed, but appear to initialization tasks 20 as unemployed. These system protection features include in particular the disallowance of any attempt to switch the execution mode from a protected mode to an unprotected or real mode.

Additionally, interrupts and exceptions arisen in the course of execution of initialization tasks 20 are redirected to virtual mode execution monitor 28 for handling.

For the illustrated embodiment, each initialization task 20 has a corresponding task state 14 created by the BIOS 10, containing a number of environmental definitions defining the execution context of the particular initialization task 20. Initialization service 12 sets the execution context of initialization tasks 20 by setting these environmental definitions. More specifically, initialization service 12 sets a CPU mode parameter to identifying the virtual mode as the execution mode for the initialization task 20. Furthermore, initialization service 12 sets a base address pointer to an interrupt handler map to a starting address of virtual mode execution monitor 28.

In one embodiment, the add-on device is designed to be added on to a computer system, employing an Intel Architecture processor, the virtual mode is the virtual x86 mode, and task state 14 is a task state segment. Initialization service 12 sets the CPU mode parameter to virtual mode by setting the virtual X86 mode bit of the EFLAG register image.

As a result, during execution of initialization task 20, any attempt by a initialization task 20 to switch the execution mode from a protected mode to an unprotected or real mode, or vice versa, will result in the system protection features trapping an exception to virtual mode execution monitor 28. As will be described in more detail below, these attempted operations will be disallowed by virtual mode execution monitor 28, however the disallowance will be made transparent to initialization tasks 20. Initialization tasks 20 will continue to execute as if the processor is in an unprotected or real mode. Thus, additional attempted operations by initialization tasks 20 that are disallowed under the protected mode will also result in the system protection features triggering interrupts/trapping exceptions to virtual mode execution monitor 28. Under each of these circumstances, virtual mode execution monitor 28 will handle the interrupt/exception as appropriate, allowing those that do not threaten system stability, recovering the disallowed ones that are recoverable, otherwise, terminates initialization tasks 20 to protect the system.

Figure 3:
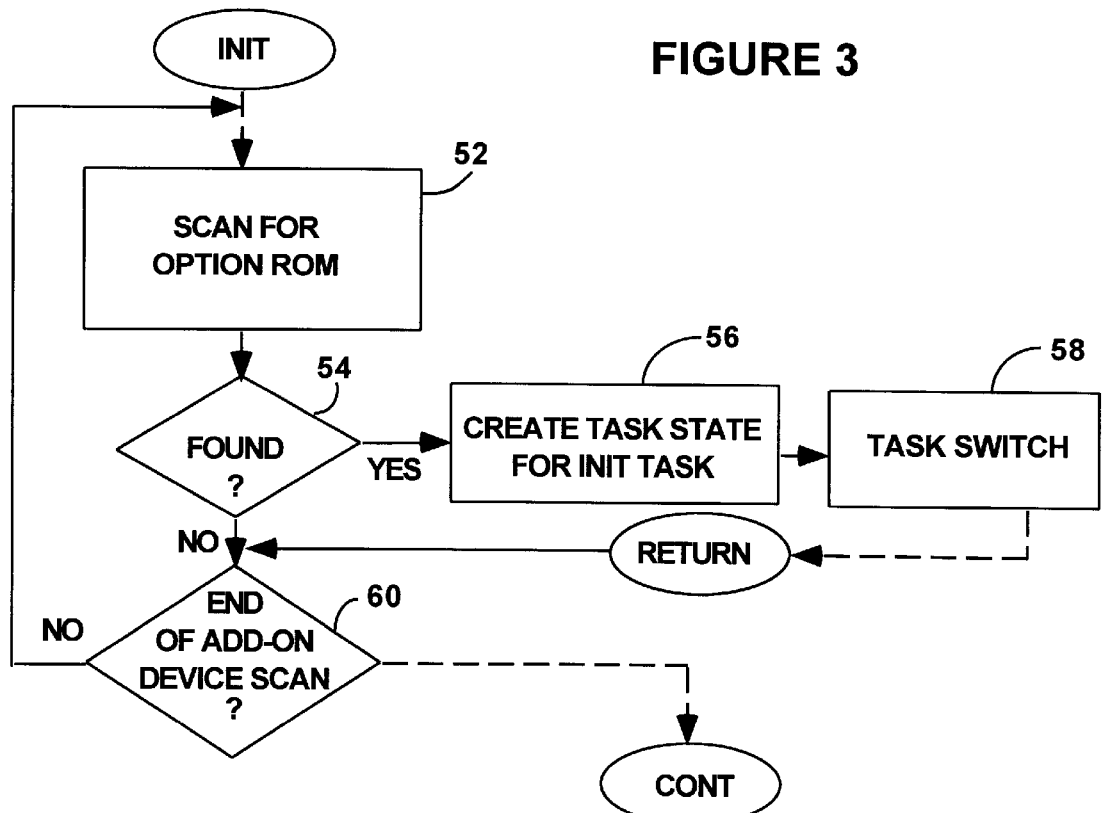
FIGS. 3–4 illustrate one embodiment each of the operational steps of the initialization service of the BIOS of FIG. 1 and the virtual mode execution monitor.

FIG. 3 illustrates the relevant operational steps of one embodiment of initialization service 12. As shown, at set up time, e.g. power on or reset, as an integral part of the set up process, initialization service 12 scans for option ROMs of add-on devices present in the system, step 52. For the illustrated embodiment, as soon as an option ROM is found, step 54, initialization service 12, creates a task state descriptor for the initialization task 20 of the option ROM, step 56. In particular,, initialization service 12 sets the execution mode of initialization task 20 to the virtual mode, and redirects interrupt and exception handling as described earlier. Initialization service 12 then switches control to the initialization task 20, step 58. Upon returning from the initialization task 20, initialization service 12 determines if there are more add-on devices to scan, step 60. If there are more add-on devices to scan, initialization service 12 repeats steps 52–58, until it has determined at step 60 that all add-on devices have been scanned. At such time, initialization service 12 continues with the remaining initialization steps.

Figure 4:
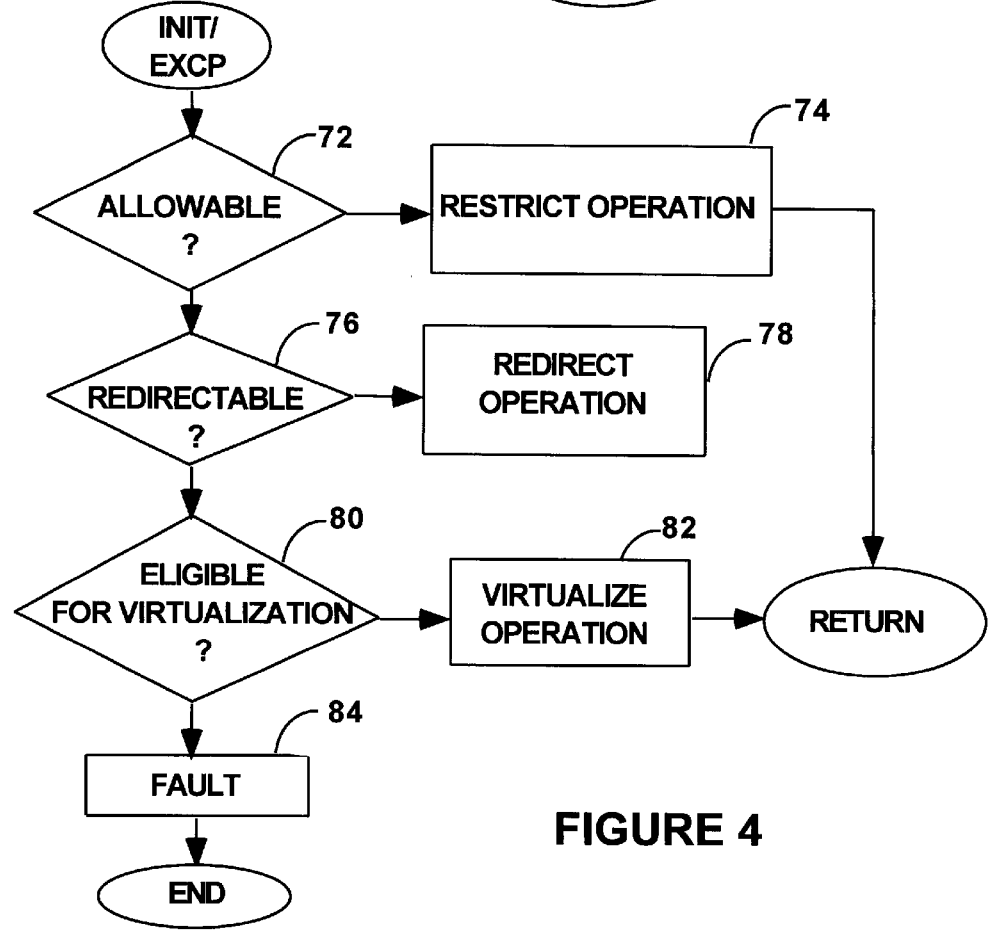

FIG. 4 illustrates the operational steps of one embodiment of virtual mode execution monitor 28. As shown, upon given control as a result of the system protection features triggering an interrupt or trapping an exception, virtual mode execution monitor 28 determines if the interrupt/exception triggering attempted operations is allowable, step 72. The type of operations that are deemed allowable may vary from one embodiment to another, depending on how much protection a system designer seeks versus how much leeway the system designer is willing to grant to an add-on device. If the interrupt/exception triggering attempted operation is deemed allowable, virtual mode execution monitor 28 restarts the operation, step 74. On the other hand, if the interrupt/exception triggering attempted operation is deemed impermissible, for the illustrated embodiment, virtual mode execution monitor 28 further determines if the operation is retargetable, step 78. For example, if the impermissible operation is a write to a protected portion of memory for storing certain working data, virtual mode execution monitor 28 can easily redirect the write to an unprotected area of memory, and maintain a re-mapping for the initialization task 20. Whether an impermissible operation is retargetable is predetermined.

If the impermissible is not retargetable, for the illustrated embodiment, virtual mode execution monitor 28 further determines if performance of the impermissible operation can be virtualized, step 80. In other words, whether the initialization task 20 can be "misled". For example, if the impermissible operation is a read from a protected device, for certain protected devices, the initialization task 20 can be misled with a virtualized reply of no data. Similarly, whether an impermissible operation can be virtualized is predetermined. If the impermissible operation is determined to be not eligible for virtualization, step 80, for the illustrated embodiment, virtual mode execution monitor 28 terminates the interrupt/exception triggering initialization task 20, step 84.

FIG. 5 illustrates one embodiment of a computer system suitable for practicing the present invention described above. As shown, for the illustrated embodiment, computer system 100 includes processor 102, processor bus 104, high performance I/O bus 106 and standard I/O bus 108. Processor bus 104 and high performance I/0 bus 106 are bridged by host bridge 110, whereas I/O buses 106 and 108 are bridged by I/O bus bridge 112. Coupled to processor bus 104 is cache 114. Coupled to high performance I/O bus 106 are system memory 116 and video memory 118, against which video display 120 is coupled. Coupled to standard I/O bus 108 are read only memory 122, disk drive 124, keyboard and pointing device 126 and communication interface 128.

These elements perform their conventional functions known in the art, except read only memory 122 is incorporated with the BIOS having the initialization service and virtual mode execution monitor of the present invention. The conventional functions known in the art include in particular the ability for processor 102 to execute in a real mode, a protected mode, and a virtual mode as described earlier, and the ability for processor 102 to selectively protect varying degree of system protection, depending on the execution mode. For the illustrated embodiment, processor 102 is an Intel Architecture based processor. Furthermore, disk drive 124 is used to store at least a permanent copy for each of the add-on device initialization task, and system memory 116 is used to store a working copy of the initialization tasks, as well as a working copy of each of the programming instruction sets for effectuating the initialization service and the virtual mode execution monitor of the present invention, Except for the teachings of the present invention, constitutions of these elements are known. Any one of a number of implementations of these elements known in the art may be used to form computer system 100 for practice of the present invention.

While the method and apparatus of the present invention have been described in terms of the above illustrated embodiments, those skilled in the art will recognize that the invention is not limited to the embodiments described. The present invention can be practiced with modification and alteration within the spirit and scope of the appended claims. In particular, numerous variants of the above described data structures may be employed instead. Accordingly, the description is to be regarded as illustrative instead of restrictive on the present invention.

Thus, a method and apparatus for controlling ill-behaved add-on devices have been described.

What is claimed is:

1. An apparatus comprising a storage medium having stored therein an initialization service of a set of basic input/output services (BIOS), the initialization service including operating logic for locating initialization tasks of devices added on to the apparatus, and for creating execution context of the initialization tasks, wherein the apparatus is equipped with system protection features that can be selectively employed or not employed, and the operating logic creates the context in a manner such that the initialization tasks are executed with the employment of the system protection features and with interrupts and exceptions arisen during execution of the initialization tasks redirected to a predetermined execution monitor.

2. The apparatus as set forth in claim 1, wherein the operating logic for creating the execution context of a initialization task includes operating logic for setting an execution mode to a virtual mode, under which the system protection features are employed during execution, but appear to be not employed to the initialization task.

3. The apparatus as set forth in claim 1, wherein the operating logic for creating the execution context of an initialization task includes operating logic for setting a pointer to an interrupt/exception handler map to a starting address of the execution monitor.

4. The apparatus as set forth in claim 1, wherein the apparatus includes the predetermined execution monitor.

5. The apparatus as set forth in claim 1, wherein the execution monitor includes operating logic for determining if an interrupt/exception triggering operation attempted by a initialization task is permissible.

6. The apparatus as set forth in claim 5, wherein the execution monitor further includes operating logic for restarting the interrupt/exception triggering operation, if the interrupt/exception triggering operation is determined to be permissible.

7. The apparatus as set forth in claim 5, wherein the execution monitor further includes operating logic for determining if interrupt/exception triggering operation is recoverable, if the interrupt/exception triggering operation is determined to be impermissible.

8. The apparatus as set forth in claim 7, wherein the execution monitor further includes operating logic for retargeting the interrupt/exception triggering operation, if the interrupt/exception triggering operation is determined to be impermissible, but retargetable.

9. The apparatus as set forth in claim 7, wherein the execution monitor further includes operating logic for returning a harmless virtualized result of the interrupt/exception triggering operation, if the interrupt/exception triggering operation is determined to be impermissible, but eligible for virtualization.

10. The apparatus as set forth in claim 1, wherein the apparatus is a motherboard for forming a computer system.

11. The apparatus as set forth in claim 1, wherein the apparatus is a computer system.

12. A method for controlling ill-behaved add on devices of computer systems equipped with system protection features that can be selectively employed or not employed, the method comprising the steps of:

(a) locating initialization tasks of the add on devices;

(b) creating execution context of the initialization tasks in a manner such that the initialization tasks are executed with the employment of system protection features; and (c) further setting up the execution context of the initialization tasks such that interrupts and exceptions arisen during execution of the initialization tasks are redirected to a predetermined execution monitor.

13. The method as set forth in claim 12, wherein step (b) comprises setting an execution mode to a virtual mode, under which the system protection features are employed during execution, but appear to be not employed to the initialization task.

14. The method as set forth in claim 12, wherein step (c) comprises setting a pointer to an interrupt/exception handler map to a starting address of the execution monitor.

15. The method as set forth in claim 12, wherein the method further includes step (d) determining if an interrupt/exception triggering operation attempted by a initialization task is permissible.

16. The method as set forth in claim 15, wherein the method further comprises step (e) restarting the interrupt/exception triggering operation, if the interrupt/exception triggering operation is determined to be permissible.

17. The method as set forth in claim 15, wherein the method further comprises step (e) determining if interrupt/exception triggering operation is recoverable, if the interrupt/exception triggering operation is determined to be impermissible.

18. The method as set forth in claim 17, wherein the method further comprises step (f) retargeting the interrupt/exception triggering operation, if the interrupt/exception triggering operation is determined to be impermissible, but retargetable.

19. The method as set forth in claim 17, wherein the method further comprises step (f) returning a harmless fake result of the interrupt/exception triggering operation, if the interrupt/exception triggering operation is determined to be impermissible, but eligible for virtualization.

* * * * *